United States Patent
Shimura et al.

(10) Patent No.: US 9,514,480 B2
(45) Date of Patent: Dec. 6, 2016

(54) ADVERTISEMENT DELIVERY MANAGEMENT APPARATUS AND ADVERTISEMENT DELIVERY MANAGEMENT METHOD

(71) Applicant: YAHOO JAPAN CORPORATION, Tokyo (JP)

(72) Inventors: Kazuhiko Shimura, Tokyo (JP); Koji Tsukamoto, Tokyo (JP); Akira Tajima, Tokyo (JP); Hiroyuki Kato, Tokyo (JP); Takenobu Dei, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 453 days.

(21) Appl. No.: 14/097,563

(22) Filed: Dec. 5, 2013

(65) Prior Publication Data

US 2014/0164104 A1    Jun. 12, 2014

(30) Foreign Application Priority Data

Dec. 11, 2012  (JP) ................. 2012-270219

(51) Int. Cl.
*G06Q 30/02* (2012.01)
(52) U.S. Cl.
CPC ................. *G06Q 30/0251* (2013.01)
(58) Field of Classification Search
CPC ................................ G06Q 30/0244
See application file for complete search history.

(56) References Cited

U.S. PATENT DOCUMENTS

| | | |
|---|---|---|
| 2008/0300964 A1 | 12/2008 | Raghunandan |
| 2009/0132346 A1 | 5/2009 | Duggal et al. |
| 2010/0082402 A1 | 4/2010 | Kantak et al. |
| 2010/0161419 A1 | 6/2010 | Tomlin |
| 2010/0185484 A1 | 7/2010 | Sordo et al. |

(Continued)

FOREIGN PATENT DOCUMENTS

| | | |
|---|---|---|
| JP | A-9-91358 | 4/1997 |
| JP | A-2001-265810 | 9/2001 |

(Continued)

OTHER PUBLICATIONS

Dec. 16, 2015 Office Action issued in U.S. Appl. No. 14/103,406.

(Continued)

*Primary Examiner* — Namrata Boveja
*Assistant Examiner* — Robert C Johnson
(74) *Attorney, Agent, or Firm* — Oliff PLC (57) ABSTRACT

An advertisement delivery management apparatus according to an embodiment includes a predicted information storage unit, an allocating unit, and a reallocating unit. The predicted information storage unit stores information including user attributes of a plurality of delivery target users predicted as future advertisement delivery destinations. The allocating unit allocates the delivery target user to an advertisement delivery order request based on the information stored in the predicted information storage unit. The reallocating unit performs a reallocating process of exchanging the delivery target user allocated to the order request with a non-allocated user who is the delivery target user that has not been allocated to the order request.

18 Claims, 6 Drawing Sheets

(56) References Cited

U.S. PATENT DOCUMENTS

2011/0161162 A1* 6/2011 Ketchum .............. G06Q 30/02
  705/14.43
2011/0251875 A1  10/2011 Cosman
2011/0258045 A1  10/2011 Chickering et al.
2012/0041817 A1* 2/2012 Priyadarshan ..... G06Q 30/0244
  705/14.43

FOREIGN PATENT DOCUMENTS

| JP | A-2001-297251 | 10/2001 |
| JP | 2001-325505 A | 11/2001 |
| JP | A-2001-306439 | 11/2001 |
| JP | A-2002-41670 | 2/2002 |
| JP | A-2003-6518 | 1/2003 |
| JP | A-2003-67290 | 3/2003 |
| JP | A-2005-196777 | 7/2005 |
| JP | A-2007-200168 | 8/2007 |
| JP | A-2009-163425 | 7/2009 |
| JP | A-2011-238020 | 11/2011 |
| JP | 2012-043193 A | 3/2012 |
| JP | A-2012-108663 | 6/2012 |
| WO | WO 02/061619 | 8/2002 |

OTHER PUBLICATIONS

Japanese Office Action issued in Japanese Application No. 2012-270605 mailed Jun. 3, 2014 (with translation).
Japanese Office Action issued in Japanese Application No. 2012-282033 mailed May 20, 2014 (with translation).
Jun. 16, 2015 Office Action issued in Japanese Patent Application No. 2014-126340.
Jun. 3, 2014 Office Action issued in Japanese Application No. 2012-270219 (with translation).
Jun. 17, 2014 Office Action issued in Japanese Application No. 2012-258777 (with translation).
Jun. 17, 2014 Office Action issued in Japanese Application No. 2012-258788 (with translation).
Mar. 11, 2015 Office Action issued in U.S. Appl. No. 14/103,406.
Jun. 10, 2016 Office Action issued in U.S. Appl. No. 14/107,428.
Mar. 18, 2016 Office Action Issued in U.S. Appl. No. 14/094,198.
Mar. 23, 2016 Office Action issued in U.S. Appl. No. 14/086,489.
Mar. 24, 2016 Office Action Issued in U.S. Appl. No. 14/086,604.
Mar. 29, 2016 Office Action issued in Japanese Patent Application No. 2014-126340.

* cited by examiner

| USER ID | PSYCHOGRAPHIC ATTRIBUTE | | | | ... | DEMOGRAPHIC ATTRIBUTE | | ... |
|---|---|---|---|---|---|---|---|---|
| | VEHICLE | COS-METICS | CLOTHES | TRAVEL | ... | SEX | AGE | ... |
| U0001 | 1 | 0 | 0 | 1 | ... | 2 | 21 | ... |
| U0002 | 0 | 0 | 1 | 0 | ... | 1 | 44 | ... |
| ⋮ | ⋮ | ⋮ | ⋮ | ⋮ | ⋮ | ⋮ | ⋮ | ⋮ |

FIG.5

| DATE | USER ID |
|---|---|
| 12/1/2013 6:11:05 | U0001 |
| 12/1/2013 6:11:06 | U0102 |
| 12/1/2013 6:12:08 | U0082 |
| 12/1/2013 6:12:44 | U0001 |
| 12/1/2013 6:13:02 | U0102 |
| 12/1/2013 6:13:21 | U0082 |
| ⋮ | ⋮ |

FIG.6

| DISTRI-BUTION TARGET ID | ALLO-CATION STATE | ALLO-CATION TARGET | PSYCHOGRAPHIC ATTRIBUTE | | | | | DEMOGRAPHIC ATTRIBUTE | | |
|---|---|---|---|---|---|---|---|---|---|---|
| | | | VEHICLE | COS-METICS | CLOTHES | TRAVEL | ... | SEX | AGE | ... |
| F0001 | 0 | 0 | 0 | 1 | 0 | 1 | ... | 1 | 54 | ... |
| F0002 | 1 | A0003 | 0 | 0 | 1 | 1 | ... | 2 | 22 | ... |
| F0003 | 0 | 0 | 0 | 0 | 0 | 0 | ... | 2 | 32 | ... |
| F0004 | 0 | 0 | 1 | 0 | 0 | 0 | ... | 1 | 21 | ... |
| F0005 | 1 | A0002 | 1 | 0 | 0 | 1 | ... | 2 | 32 | ... |
| F0006 | 0 | 0 | 1 | 1 | 1 | 1 | ... | 1 | 21 | ... |
| F0007 | 1 | A0001 | 1 | 1 | 1 | 0 | ... | 2 | 22 | ... |
| F0008 | 1 | A0002 | 0 | 0 | 0 | 1 | ... | 2 | 32 | ... |
| F0009 | 1 | A0001 | 1 | 0 | 0 | 0 | ... | 1 | 21 | ... |
| F0010 | 1 | A0001 | 1 | 0 | 0 | 1 | ... | 2 | 32 | ... |
| F0011 | 1 | A0002 | 1 | 1 | 0 | 1 | ... | 1 | 21 | ... |
| ... | ... | ... | ... | ... | ... | ... | ... | ... | ... | ... |

FIG.7

| DELIVERY TARGET ID | NUMBER OF USER ATTRIBUTES |
|---|---|
| F0001 | 4 |
| F0003 | 2 |
| F0004 | 3 |
| F0006 | 6 |
| TOTAL NUMBER OF USER ATTRIBUTES | 15 |

ADVERTISEMENT DELIVERY MANAGEMENT APPARATUS AND ADVERTISEMENT DELIVERY MANAGEMENT METHOD

CROSS-REFERENCE TO RELATED APPLICATIONS

The present application claims priority to and incorporates by reference the entire contents of Japanese Patent Application No. 2012-270219 filed in Japan on Dec. 11, 2012.

BACKGROUND OF THE INVENTION

1. Field of the Invention

The present invention relates to an advertisement delivery management apparatus and an advertisement delivery management method.

2. Description of the Related Art

In recent years, with a rapid spread of networks such as the Internet, advertisement delivery using a network has been actively performed. As one form of the advertisement delivery, display advertisement is known in which an advertisement is displayed using an image, a video, or the like on a certain space within a page (hereinafter referred to as an advertisement delivery target page) serving as a target of advertisement delivery.

In the display advertisement, effective advertisement delivery is realized by delivering an advertisement to a user having a user attribute (sex, age, interest, or the like) designated by an advertiser (for example, see Japanese Patent Application Laid-Open No. 2011-238020).

In the above-described advertisement delivery, when a user attribute of a user who accesses the advertisement delivery target page is the user attribute designated by the advertiser, an advertisement is delivered. Thus, it is desirable to predict a delivery target user serving as a future advertisement delivery destination as a future log along with a user attribute thereof and to accept an order from an advertiser based on the future log.

However, when the delivery target user serving as a future advertisement delivery destination has a plurality of user attributes, the delivery target user is allocated in the order of the advertisement delivery orders. As a result, the delivery target users may not be allocated appropriately.

SUMMARY OF THE INVENTION

According to an exemplary embodiment, an advertisement delivery management apparatus includes a predicted information storage unit, an allocating unit, and a reallocating unit. The predicted information storage unit stores information including user attributes of a plurality of delivery target users predicted as future advertisement delivery destinations. The allocating unit allocates the delivery target user to an advertisement delivery order request based on the information stored in the predicted information storage unit. The reallocating unit performs a reallocating process of exchanging the delivery target user allocated to the order request with a non-allocated user who is the delivery target user that has not been allocated to the order request.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a mode (hereinafter referred to as an "embodiment") for implementing an advertisement delivery management apparatus and an advertisement delivery management method according to the present application will be described in detail with reference to the drawings. The advertisement delivery management apparatus and the advertisement delivery management method according to the present application are not limited to this embodiment. In the following description, "database" will be described as "DB."

1. Advertisement Delivery Management Process

Figure 1A:
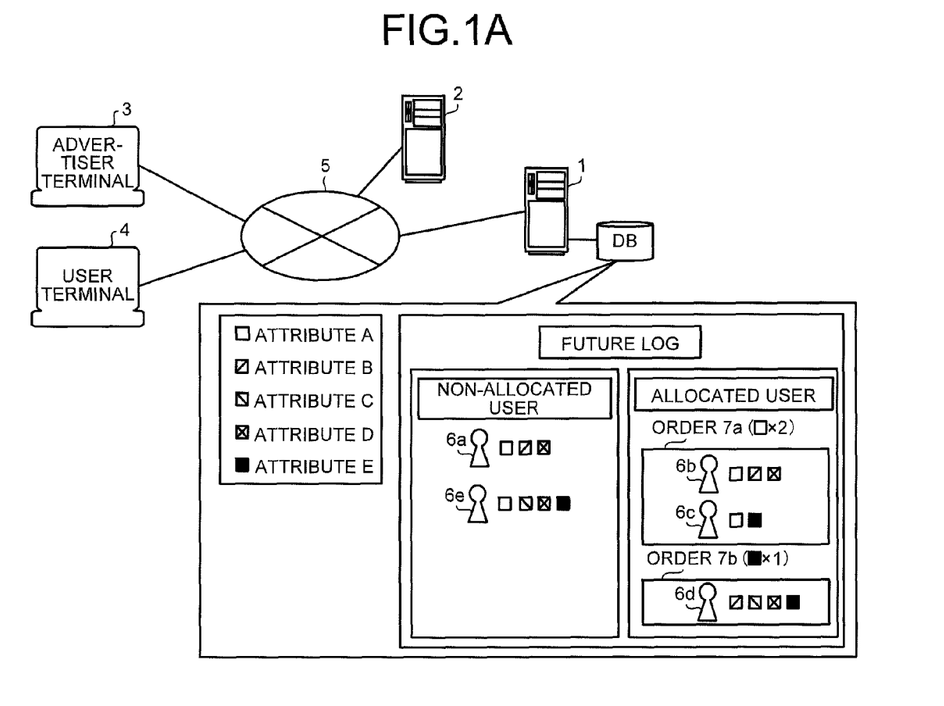
FIGS. 1A and 1B are diagrams for describing an advertisement delivery management process according to an embodiment.
Figure 1B:
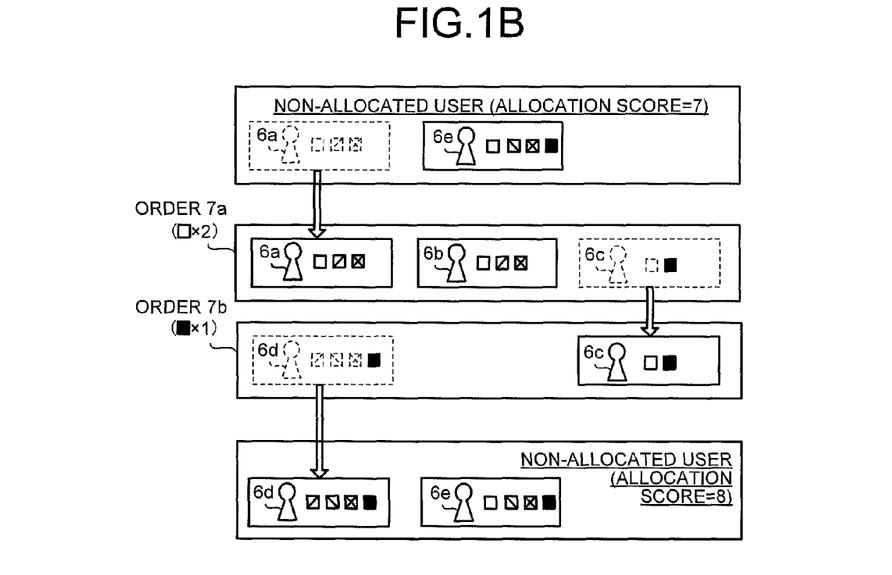

First, an advertisement delivery management process according to an embodiment will be described. FIGS. 1A and 1B are diagrams for describing an advertisement delivery management process according to the embodiment. The advertisement delivery management process allows delivery target users to be allocated and reallocated to orders from an advertiser.

As illustrated in FIG. 1A, an advertisement delivery management system according to the embodiment includes an advertisement delivery management apparatus 1, an information delivery apparatus 2, an advertiser terminal 3, and a user terminal 4. The advertisement delivery management apparatus 1, the information delivery apparatus 2, the advertiser terminal 3, and the user terminal 4 are connected to each other via a communication network 5. The communication network 5 is an Internet protocol (IP) network such as the Internet, for example. Although a plurality of advertiser terminals 3 and a plurality of user terminals 4 are present, only one advertiser terminal and one user terminal are illustrated in FIG. 1A for convenience in description.

The advertiser terminal 3 is a terminal apparatus of an advertiser who wants to deliver advertisements and transmits, to the advertisement delivery management apparatus 1, an order (hereinafter referred to as an order request) for an advertisement that is to be delivered to the user terminal 4 of a user having a predetermined user attribute. Specifically, the advertiser terminal 3 transmits an order request to the advertisement delivery management apparatus 1, including advertisement information that the advertiser wants to be posted on an advertisement delivery target page and information on a user attribute designated as a delivery destination. Examples of advertisement information include two-dimensional contents such as a banner advertisement, a text advertisement, or a video advertisement and three-dimensional contents.

The user terminal 4 is a terminal apparatus of a user who accesses the advertisement delivery management apparatus 1 and the information delivery apparatus 2. When there is an access from the user terminal 4, the information delivery apparatus 2 transmits an advertisement delivery target page such as a Web page to the user terminal 4. The advertisement delivery target page includes a uniform resource locator (URL) of advertisement information, and the user terminal 4 transmits an advertisement request to the advertisement delivery management apparatus 1 based on the URL. The URL of the advertisement information may be the URL of the information delivery apparatus 2 rather than the URL of the advertisement delivery management apparatus 1. In this case, the user terminal 4 requests the information delivery apparatus 2 for the advertisement information based on the URL of the advertisement information. Upon receiving the request, the information delivery apparatus 2 transmits a request to the advertisement delivery management apparatus 1 for transmitting the advertisement information to the user terminal 4. The advertisement delivery management apparatus 1 transmits advertisement information corresponding to the transmission request from the information delivery apparatus 2 to the user terminal 4.

The advertisement delivery management apparatus 1 executes the processes ranging from the process of accepting an advertisement delivery order to the process of delivering an advertisement by performing an order request accepting process, an allocating process of allocating a user attribute to an accepted order request, and a process of delivering advertisement information designated by the order request. Further, the advertisement delivery management apparatus 1 performs a reallocating process of reallocating the user attribute at a predetermined point in time after performing the process of allocating the user attribute to the order request.

The advertisement delivery management apparatus 1 stores information including the user attributes of a plurality of delivery target users predicted as a future advertisement delivery destination in a DB as a future log and executes the order request accepting process and the user attribute allocating process based on the future log.

In the example illustrated in FIG. 1A, delivery target users 6b to 6d are allocated to order requests 7a and 7b. Specifically, the order request 7a is an order request that requests advertisement delivery to two delivery target users having a user attribute A, and the order request 7b is an order request that requests advertisement delivery to one delivery target user having a user attribute E. These order requests 7a and 7b are sequentially accepted by the advertisement delivery management apparatus 1.

The advertisement delivery management apparatus 1 allocates the two delivery target users 6b and 6c having the user attribute A to the order request 7a and allocates one delivery target user 6d having the user attribute E to the order request 7b.

After that, the advertisement delivery management apparatus 1 performs a user attribute reallocating process at a predetermined point in time. The reallocating process is performed in such a way that the score (hereinafter referred to as an allocation score) corresponding to an allocation state of the delivery target users 6a to 6e to the order requests 7a and 7b increases. In this embodiment, an example in which the total number of user attributes of the delivery target users 6a and 6e (hereinafter sometimes referred to as "non-allocated users") who are not allocated to the order requests 7a and 7b is defined as the allocation score will be described.

The non-allocated user 6a has three user attributes A, B, and D, and the non-allocated user 6e has four user attributes A and C to E. Thus, the allocation score which is the total number of user attributes of the non-allocated users 6a and 6e is "7."

The advertisement delivery management apparatus 1 performs the reallocating process based on three-party exchange by allocating a non-allocated user to an allocatable order request, allocating a delivery target user allocated to this order request to another order request, and changing a delivery target user allocated to the another order request to a non-allocated user.

Specifically, as illustrated in FIG. 1B, the advertisement delivery management apparatus 1 allocates the non-allocated user 6a to the allocatable order request 7a, allocates the delivery target user 6c allocated to this order request 7a to the order request 7b, and changes the delivery target user 6d allocated to the order request 7b to a non-allocated user. With such a change, the allocation score increases from "7" to "8."

On the other hand, it is assumed that the non-allocated user 6e is allocated to the allocatable order request 7a, the delivery target user 6c allocated to the order request 7a is allocated to the order request 7b, and the delivery target user 6d allocated to the order request 7b is changed to a non-allocated user. In this case, the allocation score is still "7."

Thus, the advertisement delivery management apparatus 1 performs the reallocating process in the former combination where the allocation score increases from "7" to "8" among the modes of three-party exchange described. Since the allocation score is the total number of user attributes, the larger the allocation score is, the more number of choices for allocation of the delivery target user to a new order request can be increased. Therefore, it is possible to appropriately allocate the delivery target user to the advertisement delivery order.

In the above description, although the advertisement delivery management apparatus 1 performs the reallocating process in such a combination of three-party exchange that the allocation score increases, the reallocating process is not limited to such a three-party exchange. For example, instead of three-party exchange, two-party exchange may be used such that a delivery target user (hereinafter referred to as an allocated user) allocated to an order request is exchanged with a non-allocated user. Moreover, four or more parties may be exchanged. In this case, similarly, the advertisement delivery management apparatus 1 performs the reallocating process in such a manner that the allocation score increases.

By performing the reallocating process based on n-party exchange (n is an integer of 2 or more) such that the allocation score increases, it is possible to increase the possibility of accepting future order requests, and to suppress the loss of sales opportunity.

Although the advertisement delivery management apparatus 1 can increase the possibility of accepting future order requests more appropriately by performing the reallocating process based on the allocation score, the reallocating process may be performed without being based on the allocation score. Even in such a case, since the reallocating process is performed after the delivery target user allocating process is performed, it is possible to increase the possibility of accepting future order requests.

That is, since the delivery target user allocating process is performed whenever an order request is accepted, the delivery target user is not necessarily allocated appropriately. However, by reallocating delivery target users collectively to a plurality of accepted order requests, it is possible to allocate delivery target users appropriately.

Hereinafter, a specific configuration and a specific process of the advertisement delivery management apparatus 1 that executes the above-described advertisement delivery management process will be described with reference to the drawings.

2. Configuration of Advertisement Delivery Management Apparatus 1

Figure 2:
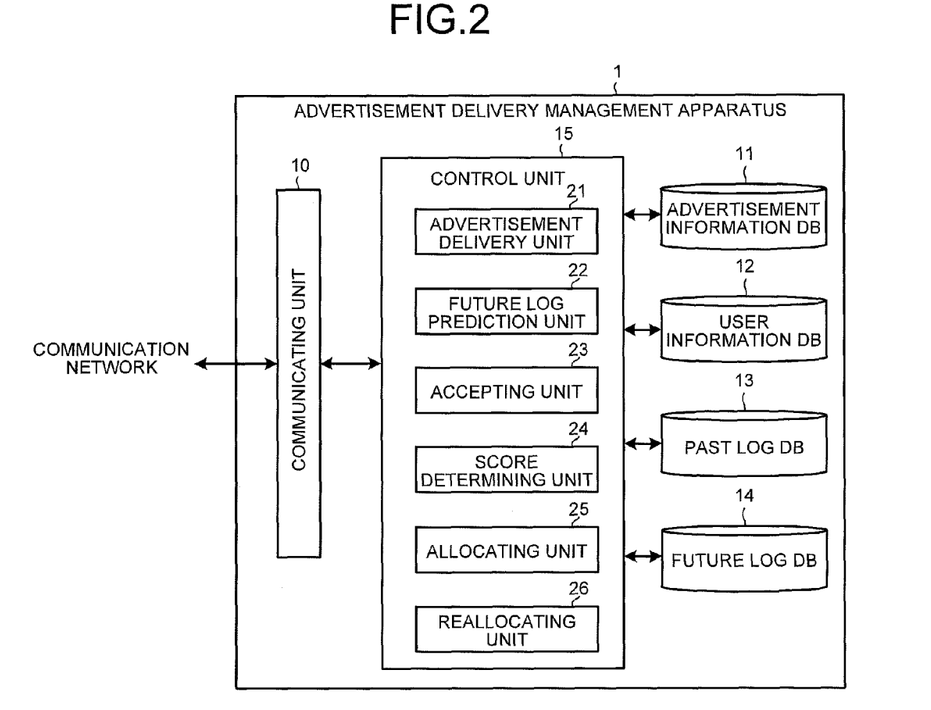
FIG. 2 is a diagram illustrating a configuration of an advertisement delivery management apparatus according to an embodiment.

FIG. 2 is a diagram illustrating a configuration of the advertisement delivery management apparatus 1 according to the embodiment. As illustrated in FIG. 2, the advertisement delivery management apparatus 1 includes a communicating unit 10, an advertisement information DB 11, a user information DB 12, a past log DB 13, a future log DB 14, and a control unit 15. Further, the control unit 15 includes an advertisement delivery unit 21, a future log prediction unit 22, an accepting unit 23, a score determining unit 24, an allocating unit 25, and a reallocating unit 26.

The communicating unit 10 is an interface such as a network interface card (NIC). The control unit 15 transmits and receives various items of information between the advertiser terminal 3 and the user terminal 4 via the communicating unit 10 and the communication network 5. The advertisement information DB 11, the user information DB 12, the past log DB 13, and the future log DB 14 are, for example, storage devices such as a hard disk, a semiconductor memory device such as a random access memory (RAM), or a flash memory, and an optical disc.

The control unit 15 is realized by an integrated circuit such as an application specific integrated circuit (ASIC) or a field programmable gate array (FPGA), for example. Moreover, the control unit 15 functions as the advertisement delivery unit 21, the future log prediction unit 22, the accepting unit 23, the score determining unit 24, the allocating unit 25, and the reallocating unit 26 when a central processing unit (CPU) or a micro-processing unit (MPU) executes a program stored in an internal storage device using a RAM as a work area. The configuration of the control unit 15 is not limited to such a configuration, and other configurations may be employed as long as the control unit 15 performs the information processing to be described below.

Advertisement Delivery Unit 21

When an advertisement information delivery request is received from the user terminal 4, the advertisement delivery unit 21 acquires advertisement information corresponding to the user attribute of the user of the user terminal 4 from an advertisement information table stored in the advertisement information DB 11 and transmits the acquired advertisement information to the user terminal 4 which is a delivery requestor via the communicating unit 10.

Figure 3:
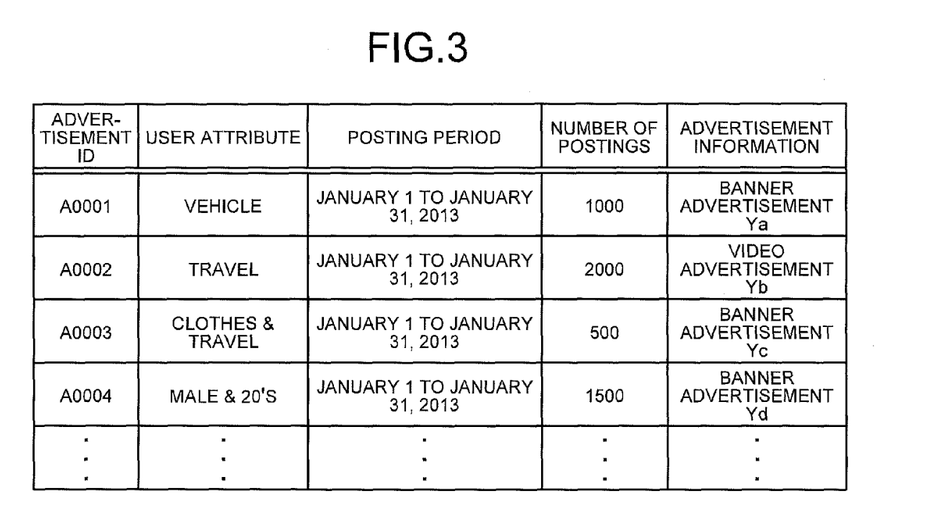
FIG. 3 is a diagram illustrating an example of an advertisement information table.

FIG. 3 is a diagram illustrating an example of the advertisement information table stored in the advertisement information DB 11. As illustrated in FIG. 3, information associated with a "user attribute," a "posting period," the "number of postings," and "advertisement information" is included in the advertisement information table for each "advertisement ID."

The "advertisement ID" is identification information that is allocated to each of the accepted order requests. The "user attribute" is a user attribute designated by the order request, the "posting period" is an advertisement information delivery period designated by the order request, and the "number of postings" is the number of deliveries of advertisement information designated by the order request. Moreover, the "advertisement information" is advertisement information designated by the order request.

For example, an advertisement ID "A0001" indicates that a user attribute is "vehicle," an advertisement information delivery period is "Jan. 1 to Jan. 31, 2013," the number of deliveries of advertisement information is "1000 times," and the advertisement information is "banner advertisement Ya" for delivery target. When the number of deliveries of advertisement information exceeds "1000 times" even within the advertisement information delivery period, the process of delivering advertisement information to an order request ends.

When the user of the user terminal 4 that outputs an advertisement information delivery request has the user attribute "vehicle," the advertisement delivery unit 21 acquires advertisement information "banner advertisement Ya" of the advertisement ID "A0001" from the advertisement information table of the advertisement information DB 11, for example, and transmits the advertisement information to the user terminal 4 which is a delivery requestor.

Figure 4:
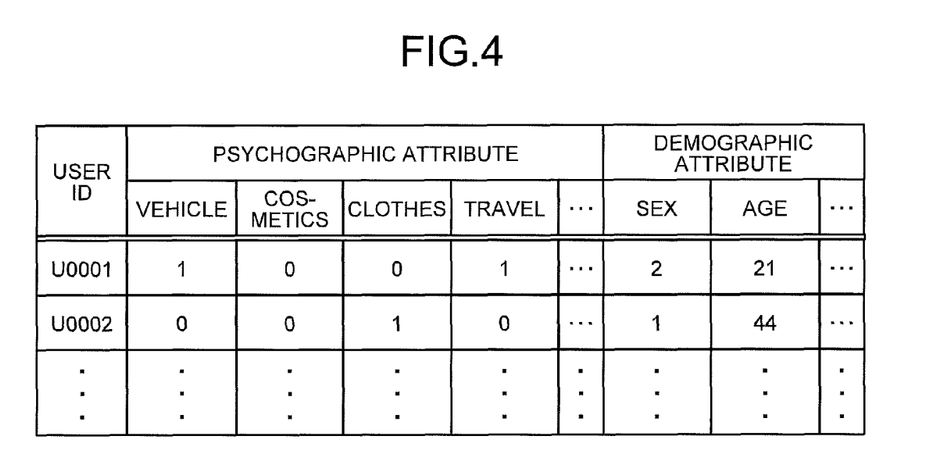
FIG. 4 is a diagram illustrating an example of a user information table.

The user attribute of the user of the user terminal 4 is determined based on the user information table of the user information DB 12. FIG. 4 is a diagram illustrating an example of the user information table stored in the user information DB 12. As illustrated in FIG. 4, the user information table includes information such as "user ID," "psychographic attribute," and "demographic attribute."

The "user ID" is identification information for identifying the user who uses the user terminal 4. The "user ID" corresponds to a user identification information that is set in a hypertext transfer protocol cookie (HTTP cookie) transmitted and received between the advertisement delivery management apparatus 1 and the user terminal 4, for example.

The "psychographic attribute" is information indicating the view of value, a life cycle, a personality, a preference, and the like of the user. The "psychographic attribute" is classified into attribute categories such as "vehicle," "cosmetics," "clothes," and "travel." In the example illustrated in FIG. 4, for each attribute category, "1" is stored when the user's preference is relatively high and "0" is stored in the other cases. The "psychographic attribute" is not limited to the examples of the attribute categories illustrated in FIG. 4, and various attribute categories such as economy, politics, a baseball, a football, other sports, sweets, a personal computer, home appliances, and furniture may be included.

The "demographic attribute" indicates demographic attribute information of the user. The "demographic attribute" is classified into attribute categories such as "sex" and "age." In the "sex" field illustrated in FIG. 4, "1" is stored when the user is a female and "2" is stored when the user is a male. Moreover, the age of the user is stored in the "age" field. The "demographic attribute" is not limited to the examples of the attribute categories illustrated in FIG. 4, and various attribute categories such as an occupation, a family structure, an annual income, an address, a birthplace, and an educational background may be included.

When a user of the user ID "U0001" illustrated in FIG. 4, for example, transmits an advertisement information delivery request from the user terminal 4, it is determined that the user attributes of the user are "vehicle," "travel," "male," "21 years old," and the like. Moreover, when a user of the user ID "U0002" illustrated in FIG. 4, for example, transmits an advertisement information delivery request from the user terminal 4, the advertisement delivery unit 21 determines that the user attributes of the user are "clothes," "female," "44 years old," and the like.

Figure 5:
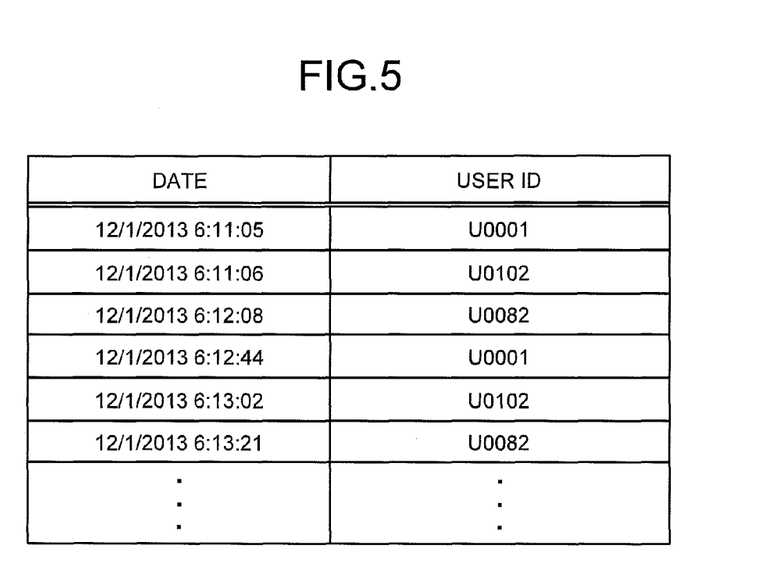
FIG. 5 is a diagram illustrating an example of an access log table.

Moreover, the advertisement delivery unit 21 sets the user ID of the user who has transmitted the advertisement information delivery request in the access log table of the past log DB 13. FIG. 5 is a diagram illustrating an example of the access log table stored in the past log DB 13.

As illustrated in FIG. 5, the access log table is a table in which information (hereinafter sometimes referred to as a "past log") that associates the date and time when the user transmits the advertisement information delivery request to the advertisement delivery management apparatus 1 with the user ID is set. The advertisement delivery unit 21 updates the access log table whenever the advertisement information delivery request is received from the user terminal 4.

When the information delivery apparatus 2 transmits an advertisement information transmission request to the user terminal 4, similarly, the advertisement delivery unit 21 acquires advertisement information corresponding to the user attribute of the user of the user terminal 4 from the advertisement information table of the advertisement information DB 11 and transmits the acquired advertisement information to the user terminal 4 via the communicating unit 10. The transmission request from the information delivery apparatus 2 includes the user ID of the user of the user terminal 4, and the advertisement delivery unit 21 acquires the advertisement information corresponding to the user attribute of the user of the user terminal 4 from the advertisement information table based on the user ID.

Future Log Prediction Unit 22

The future log prediction unit 22 determines a plurality of delivery target users predicted as a future advertisement delivery destination based on the access log table stored in the past log DB 13 and sets the user information of the determined delivery target user in the future log table of the future log DB 14.

Figure 6:
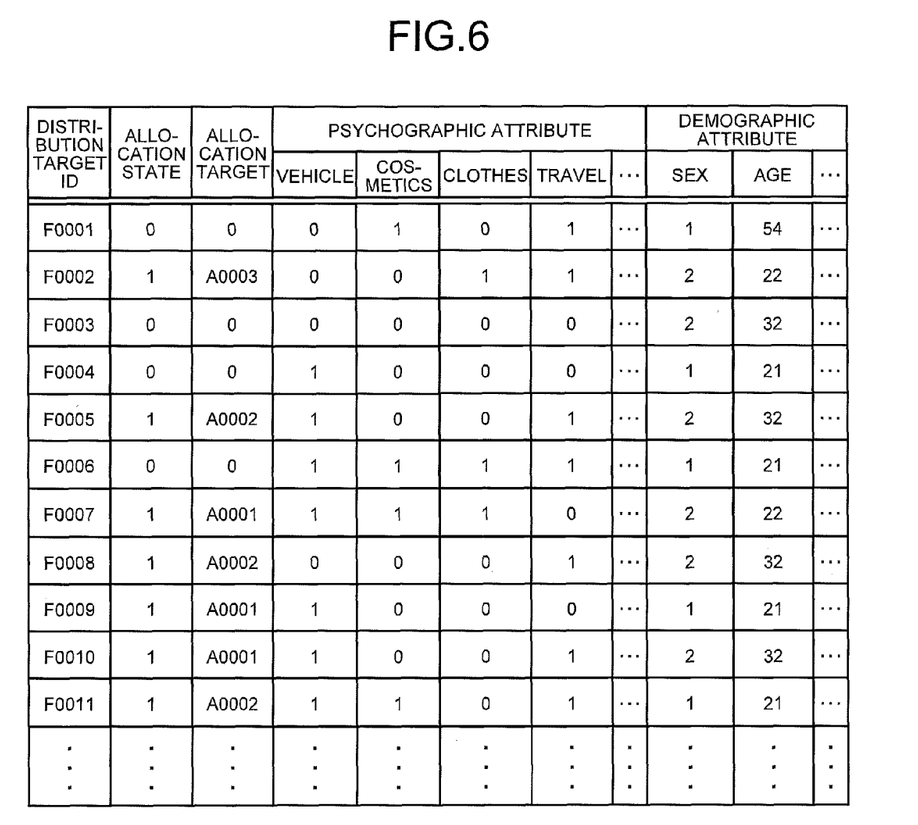
FIG. 6 is a diagram illustrating an example of a future log table.

FIG. 6 is a diagram illustrating an example of the future log table stored in the future log DB 14. As illustrated in FIG. 6, information (hereinafter sometimes referred to as a "future log") on the delivery target user predicted as the advertisement delivery destination in a predetermined future period is set in the future log table. In the future log table illustrated in FIG. 6, the information on a future log such as "delivery target ID," "allocation state," "allocation target," "psychographic attribute," and "demographic attribute" is included.

The "delivery target ID" is identification information that is allocated to each delivery target user predicted as a future advertisement delivery destination. The delivery target user is an imaginary user that is different from the user set in the user information table of the user information DB 12.

The "allocation state" is information indicating whether the user is a delivery target user who is allocated to the order request. "1" is set when the user is the delivery target user who is allocated to the order request, and "0" is set when the user is the delivery target user who is not allocated to the order request.

The "allocation target" is an advertisement ID of an order request to which the delivery target user is allocated. For example, the order request having the advertisement ID "A0002" is allocated to the delivery target user having the delivery target ID "F0005." "0" is set when the order request is not allocated.

The "psychographic attribute" and the "demographic attribute" are the same items as the user information table of the user information DB 12. The user set in the user information table may be estimated as the delivery target user, and the delivery target ID may be used as the user ID. In this case, the information "psychographic attribute" and "demographic attribute" can be acquired from the user information table based on the user ID.

The future log prediction unit 22 can estimate the delivery target user who will be an advertisement delivery destination in a predetermined future period from the access log in the same period of one year before or the access log in a predetermined period immediately before. For example, the future log prediction unit 22 can estimate the user who has transmitted the advertisement information delivery request in the previous one month as a delivery target user in a future one month.

The future log prediction unit 22 can determine the trend of the delivery target user serving as the future advertisement delivery destination by statistically processing the past log set in the access log table and predict the future log based on the determination results. In this case, the trend of the delivery target user may be determined by taking variation information such as, for example, weather or temperature into consideration.

Although the future log prediction unit 22 can set the predicted future log in the future log table, the future log acquired from an external apparatus via the communicating unit 10 may be set in the future log table.

Accepting Unit 23

The accepting unit 23 determines whether or not to accept an order request from the advertiser terminal 3 based on the future log set in the future log table. When it is determined that the order request is to be accepted, the accepting unit 23 transmits an order acceptance response to the advertiser terminal 3.

The order request from the advertiser terminal 3 includes designation information such as the user attribute and the number of postings as described above. The accepting unit 23 counts the number of non-allocated users having the user attribute designated by the order request among a plurality of delivery target users set in the future log table. When the counted number is equal to or larger than the number of postings designated by the order request, the accepting unit 23 accepts the order request from the advertiser terminal 3.

For example, when the user attribute designated by the order request is "vehicle" and the number of postings is "100," the accepting unit 23 counts the number of delivery target users in which "1" is set in the attribute category "vehicle" in the future log table. The accepting unit 23 accepts the order request from the advertiser terminal 3 when the counted number is "100" or more and does not accept the order request from the advertiser terminal 3 when the counted number is smaller than "100."

The accepting unit 23 counts a combination of two or more user attributes of which the frequency designated by the order request is a threshold value or more as one user attribute (hereinafter sometimes referred to as a combined user attribute). For example, a combination of "clothes" and "travel" has a high frequency designated by the order request, the accepting unit 23 counts the combination of "clothes" and "travel" as one user attribute.

Information on the order request accepted by the accepting unit 23 is set in the advertisement information table of the advertisement information DB 11, and the accepting unit 23 can determine the combination of two or more user attributes of which the frequency designated by the order request is a threshold value or more based on the advertisement information table.

For example, the accepting unit 23 determines the sum of the number of postings designated by the past order request as a first sum value based on the advertisement information table and determines the sum of the number of postings designated by the past order request as a second sum value for each combination of two or more user attributes. The accepting unit 23 counts a combination of user attributes of which the ratio of the second sum value to the first sum value is a predetermined threshold value or more as one user attribute.

When the combination of "clothes" and "travel" has a high frequency designated by the order request, and the future log table is in a state as illustrated in FIG. 6, the user attribute of the delivery target user of the delivery target ID "F0002" becomes "clothes & travel" rather than "clothes" and "travel."

The combination of two or more user attributes of which the frequency designated by the order request is a threshold value or more may not be determined by the accepting unit 23 but may be set separately in the user information DB 12 from an external apparatus or the like.

When the number of non-allocated users is a predetermined value or smaller or when the number of non-allocated users having a combined user attribute is a predetermined value or smaller, the accepting unit 23 may divide the combined user attribute into a plurality of user attributes. By doing so, it is possible to increase the total number of user attributes, and as a result, to increase the possibility of accepting other order requests although the possibility of accepting the order request that designates the combined user attribute decreases.

Score Determining Unit 24

The score determining unit 24 determines an allocation score corresponding to an allocation state for an order request of the delivery target user set in the future log table. The score determining unit 24 uses the combined user attribute as one user attribute similarly to the accepting unit 23.

The score determining unit 24 determines the allocation score according to a method of determining a set determination mode. The determination mode includes first to fourth determination modes, for example, and a determination mode in which these modes are combined may be provided. The determination mode is set, for example, by an administrator of the advertisement delivery management apparatus 1 from an operating unit (not illustrated) of the advertisement delivery management apparatus 1.

The first determination mode is a mode in which the total number of user attributes of the non-allocated users is used as the allocation score. When the first determination mode is set, the score determining unit 24 counts a "total number of user attributes" of the non-allocated users among the plurality of delivery target users set in the future log table. The non-allocated user is a delivery target user in which the "allocation state" in the future log table is set to "0."

The "total number of user attributes" is the sum of the "number of user attributes" of the non-allocated users. For example, when there are 1000 non-allocated users, the sum of the "number of user attributes" of 1000 non-allocated users is the "total number of user attributes."

The "number of user attributes" is the number of delivery target users that are validly set for individual attribute categories of the user attribute. The attribute category means "vehicle," "cosmetics," "clothes," "travel," and the like for the "psychographic attribute" and means "sex," "age," and the like for the "demographic attribute."

Moreover, the delivery target user set validly is a delivery target user in which "1" is set in the corresponding attribute category for the "psychographic attribute" and is a delivery target user in which information is set in the attribute category for the "demographic attribute."

For example, it is assumed that the "psychographic attribute" includes only four attribute categories of "vehicle," "cosmetics," "clothes," and "travel," and the "demographic attribute" includes only two attribute categories of "sex" and "age." In this case, the largest value of the "number of user attributes" is "6."

Figure 7:
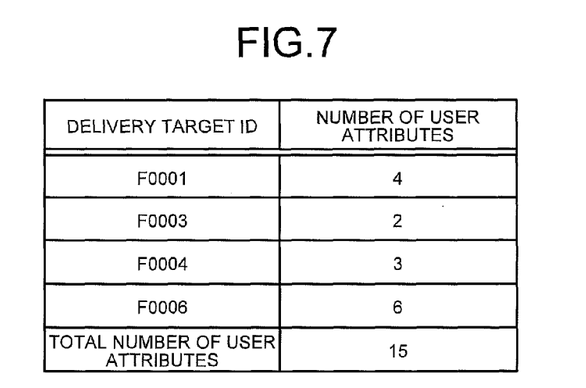
FIG. 7 is a diagram for describing a method of calculating a total number of user attributes.

The delivery target user who is not allocated to the order request is the delivery target users having the delivery target IDs "F0001," "F0003," "F0004," and "F0006," as illustrated in FIG. 6. In this case, as illustrated in FIG. 7, the "numbers of user attributes" of the delivery target users corresponding to the delivery target IDs "F0001," "F0003," "F0004," and "F0006" are "4," "2," "3," and "6," respectively. Thus, the "total number of user attributes" which is the sum of "numbers of user attributes" of the delivery target users who are not allocated to the order request is "15 (=4+2+3+6)" as illustrated in FIG. 7, and the allocation score is "15."

The score determining unit 24 may use the "total number of user attributes" for "psychographic attribute" only as the allocation score and may use the "total number of user attributes" for the "demographic attribute" only as the allocation score. Moreover, the score determining unit 24 may use the "total number of user attributes" for only part of the attribute categories of the "psychographic attribute" and the "demographic attribute" as the allocation score.

Next, the second to fourth determination modes will be described. These second to fourth determination modes are modes in which the number of individual user attributes of the non-allocated user or a value based on the proportion is used as the allocation score.

Specifically, the second determination mode is a mode in which the proportion of non-allocated users having the user attribute in which the proportion of the non-allocated user is smallest is used as the allocation score. The third determination mode is a mode in which the ratio of the proportion of the non-allocated user to a predicted proportion of individual user attributes is calculated for each user attribute, and the smallest value of the calculated ratios is used as the allocation score.

The fourth determination mode is a mode in which the ratio of the proportion of the non-allocated user to a predicted proportion of individual user attributes is calculated for each user attribute, and the sum of the calculated ratios is used as the allocation score. In the respective determination modes, "proportion" may be written as "number" as will be described below.

First, the second determination mode will be described. When the second determination mode is set, the score determining unit 24 detects a user attribute (hereinafter sometimes referred to as a smallest stock user attribute) of the attribute category in which the number of non-allocated users among the delivery target users set in the future log table is smallest. The score determining unit 24 calculates the number $A_{min}$ of non-allocated users having the smallest stock user attribute.

For example, when the number of non-allocated users having the user attribute of the attribute category "travel" among the attribute categories set in the future log table illustrated in FIG. 6 is smallest and is "40," the smallest stock user attribute is the user attribute of the attribute category "travel." In this case, the score determining unit 24 determines that the number $A_{minc}$ of non-allocated users having the smallest stock user attribute is "40."

Moreover, the score determining unit 24 may calculate the proportion $A_{minp}$ of the non-allocated user having the smallest stock user attribute instead of the number $A_{minc}$ of non-allocated users having the smallest stock user attribute. The proportion $A_{minp}$ is the ratio of the number $A_{minc}$ of non-allocated users to a total number $A_{sum}$ of user attributes of the non-allocated users.

Next, the third determination mode will be described. When the third determination mode is set, the score determining unit 24 calculates the proportion $E_{pi}$ (1≤i≤n; where i is an attribute number and n is a total number of attribute categories) (hereinafter referred to as a predicted proportion $E_{pi}$) of individual user attributes of the delivery target user set as the future log.

The predicted proportion $E_{pi}$ of the user attribute is the ratio of the total number of user attributes to the number of delivery target users having the user attribute. The "total number of user attributes" is the sum of the number of delivery target users of each user attribute. Moreover, the delivery target user includes a non-allocated user and an allocated user.

In the future log illustrated in FIG. 6, for example, it is assumed that the numbers of delivery target users having the user attributes of the attribute categories "vehicle," "cosmetics," "clothes," and "travel" are "200," "170," "130," and "280," respectively, and the total number of user attributes is "2200 (=200+170+130+280+ . . . )." Moreover, it is assumed that the attribute numbers of the attribute categories "vehicle," "cosmetics," "clothes," and "travel" are "1," "2," "3," and "4," respectively.

In this case, the proportion $E_{p1}$ of the user attribute of the attribute category "vehicle" is "0.091 (=200/2200)," the proportion $E_{p2}$ of the user attribute of the attribute category "cosmetics" is "0.077 (=170/2200)," the proportion $E_{p3}$ of the user attribute of the attribute category "clothes" is "0.059 (=130/2200)," and the proportion $E_{p4}$ of the user attribute of the attribute category "travel" is "0.127 (=280/2200)."

Moreover, when the third determination mode is set, the score determining unit 24 calculates the proportion $A_{pi}$ (1≤i≤n; where i is an attribute number and n is a total number of attribute categories, hereinafter referred to as a stock proportion $A_{pi}$) of individual user attributes of the non-allocated user set as the future log. The stock proportion $A_{pi}$ of the user attribute is the ratio of the total number of user attributes to the number of non-allocated users having the user attribute. Here, the "total number of user attributes" is the sum of the number of non-allocated users for each user attribute.

In the future log illustrated in FIG. 6, it is assumed that the numbers of non-allocated users having the user attributes of the attribute categories "vehicle," "cosmetics," "clothes," and "travel" are "120," "70," "90," and "190," respectively, and the total number of user attributes is "1400 (=120+70+90+190+ . . . )."

In this case, the stock proportion $A_{p1}$ of the user attribute of the attribute category "vehicle" is "0.086 (=120/1400)," and the stock proportion $A_{p2}$ of the user attribute of the attribute category "cosmetics" is "0.050 (=70/1400)." Moreover, the stock proportion $A_{p3}$ of the user attribute of the attribute category "clothes" is "0.064 (=90/1400)," and the stock proportion $A_{p4}$ of the user attribute of the attribute category "travel" is "0.135 (=190/1400)."

After calculating the predicted proportion $E_{pi}$ and the stock proportion $A_{pi}$ of the user attribute, the score determining unit 24 uses a smallest ratio $P_{pmin}$ among the ratios $P_{pi}$ (=$A_{pi}/E_{pi}$) of the stock proportion $A_{pi}$ to the predicted proportion $E_{pi}$ of the individual user attributes as the allocation score. The ratio $P_{pi}$ is the proportion of the user attribute after the stock proportion $A_{pi}$ is adjusted based on the predicted proportion $E_{pi}$, and will be referred to as an adjusted ratio $P_{pi}$.

For example, in the future log illustrated in FIG. 6, as described above, it is assumed that the predicted proportions $E_{p1}$, $E_{p2}$, $E_{p3}$, and $E_{p4}$ of the user attributes are 0.091, 0.077, 0.059, and 0.127, respectively, and the stock proportions $A_{p1}$, $A_{p2}$, $A_{p3}$, and $A_{p4}$ are 0.086, 0.050, 0.064, and 0.135, respectively.

In this case, the adjusted ratios $P_{p1}$, $P_{p2}$, $P_{p3}$, and $P_{p4}$ are 0.95, 0.85, 1.09, and 1.63, respectively. Thus, the smallest adjusted ratio $P_{pmin}$ among the adjusted ratios $P_{p1}$, $P_{p2}$, $P_{p3}$, and $P_{p4}$ is the adjusted ratio $P_{p2}$ corresponding to the user attribute of the attribute category "cosmetics," and the score determining unit 24 uses the smallest adjusted ratio $P_{pmin}$ (=0.85) as the allocation score.

In the above description, although the score determining unit 24 uses the smallest ratio among the ratios $P_{pi}$ (=$A_{pi}/E_{pi}$) of the stock proportion $A_{pi}$ to the predicted proportion $E_{pi}$ of the individual user attributes as the allocation score, the smallest ratio among the ratios $P_{ci}$ (=$A_{ci}/E_{ci}$) of a stock number $A_{ci}$ to a predicted number $E_{ci}$ of individual user attributes may be used as the allocation score. Here, "i" is the attribute number as described above.

The predicted number $E_{ci}$ of individual user attributes is the number of delivery target users of individual user attributes in the future log table, and the stock number $A_{ci}$ of individual user attributes is the number of non-allocated users of individual user attributes in the future log table. Moreover, the ratio $P_{ci}$ is the proportion of the user attribute after the stock number $A_{ci}$ is adjusted according to the predicted number $E_{ci}$, and will be referred to as an adjusted ratio $P_{ci}$.

For example, in the future log illustrated in FIG. 6, as described above, it is assumed that the predicted numbers of user attributes $E_{c1}$, $E_{c2}$, $E_{c3}$, and $E_{c4}$ are 200, 170, 130, and 280, respectively, and the stock numbers $A_{c1}$, $A_{c2}$, $A_{c3}$, and $A_{c4}$ are 120, 70, 90, and 190, respectively.

In this case, the adjusted ratios $P_{c1}$, $P_{c2}$, $P_{c3}$, and $P_{c4}$ are 0.6, 0.41, 0.69, and 0.68, respectively. Thus, the smallest adjusted ratio $P_{min}$ among the adjusted ratios $P_{c1}$, $P_{c2}$, $P_{c3}$, and $P_{c4}$ is the adjusted ratio $P_{c2}$ corresponding to the user attribute of the attribute category "cosmetics," and the score determining unit 24 uses the smallest adjusted ratio $P_{cmin}$ (=0.41) as the allocation score.

Next, the fourth determination mode will be described. When the fourth determination mode is set, the score determining unit 24 calculates the adjusted ratio $P_{pi}$ (=$A_{pi}/E_{pi}$) which is the ratio of the stock proportion $A_{pi}$ to the predicted proportion $E_{pi}$ of the individual user attributes similarly to the third determination mode. The score determining unit 24 uses the sum $P_{psum}$ (=$\Sigma P_{pi}$) of the adjusted ratios $P_{pi}$ as the allocation score.

For example, in the future log illustrated in FIG. 6, as described above, it is assumed that the predicted proportions of user attributes $E_{p1}$, $E_{p2}$, $E_{p3}$, and $E_{p4}$ are 0.091, 0.077, 0.059, and 0.127, respectively, and the stock proportions $A_{p1}$, $A_{92}$, $A_{p3}$, and $A_{p4}$ are 0.086, 0.050, 0.064, and 0.135, respectively.

In this case, the adjusted ratios $P_{p1}$, $P_{p2}$, $P_{p3}$, and $P_{p4}$ are 0.95, 0.85, 1.09, and 1.63, respectively. Thus, the score determining unit 24 uses the sum $P_{psum}$ (=0.95+0.85+1.09+1.63=4.52) of the adjusted ratios as the allocation score.

In the above description, the score determining unit 24 may use the sum $P_{csum}$ (=$\Sigma P_{ci}$) of the ratios $P_{ci}$ (=$A_{ci}/E_{ci}$) of the stock number $A_{ci}$ to the predicted number $E_{ci}$ of the individual user attributes as the allocation score.

For example, in the future log illustrated in FIG. 6, as described above, it is assumed that the predicted numbers of user attributes $E_{c1}$, $E_{c2}$, $E_{c3}$, and $E_{c4}$ are 200, 170, 130, and 280, respectively, and the stock numbers $A_{c1}$, $A_{c2}$, $A_{c3}$ and $A_{c4}$ are 120, 70, 90, and 190, respectively. In this case, the adjusted ratios $P_{c1}$, $P_{c2}$, $P_{c3}$, and $P_{c4}$ are 0.6, 0.41, 0.69, and 0.68, respectively. Thus, the score determining unit 24 uses the sum $P_{csum}$ (=0.6+0.41+0.69+0.68=2.38) of the adjusted ratios as the allocation score.

Using the number of users $A_{min}$, the smallest adjusted ratio $P_{pmin}$ or $P_{cmin}$, and the sum $P_{psum}$ or $P_{csum}$ of the adjusted ratios as the allocation score means that these values are substantially used as the allocation score, and does not mean that these values are limited to be used as the allocation score.

Allocating Unit 25

Whenever an advertisement delivery order request is accepted by the accepting unit 23, the allocating unit 25 allocates the delivery target user to the order request. The allocating process is performed such that a decrease in the allocation score determined by the score determining unit 24 before and after the delivery target user is allocated in response to the advertisement delivery order request is minimized. The allocating unit 25 uses the combined user attribute as one user attribute similarly to the accepting unit 23.

Specifically, the allocating unit 25 selects the number of non-allocated users having the user attribute designated by the advertisement delivery order request corresponding to the number of postings designated by the order request from the future log table and acquires a decrease in the allocation score before and after the selected non-allocated users are allocated to the order request from the score determining unit 24.

There is a plurality of combinations of non-allocated users corresponding to the number of postings designated by the order request except for the case where only the number of non-allocated users having the user attribute designated by the advertisement delivery order request corresponding to the number of postings designated by the order request are set in the future log table. For example, when the number of non-allocated users having the user attribute designated by the advertisement delivery order request is "10" and the number of postings designated by the order request is "5," there are "252" combinations of non-allocated users.

The allocating unit 25 acquires a decrease in the allocation score before and after all combinations of non-allocated users corresponding to the number of postings designated by the order request are allocated to the order request from the score determining unit 24 and determines a combination of non-allocated users in which the decrease in the allocation score is smallest. The allocating unit 25 selects the combination of non-allocated users in which the decrease is determined to be smallest and allocates the combination of non-allocated users to the order request.

Moreover, the allocating unit 25 may select the number of non-allocated users having the user attribute designated by the order request corresponding to the number of postings designated by the order request so that the decrease in the allocation score is minimized under a predetermined limit.

As the predetermined limit, for example, a limit may be provided in such a way that non-allocated users are allocated so that the decrease in the allocation score is minimized within a range that the decrease rate of the user attributes other than the user attribute designated by the order request is a predetermined rate or smaller.

Moreover, as the predetermined limit, a limit may be provided in such a way that non-allocated users are allocated so that the decrease in the allocation score is minimized within a range that the decrease rate in an expected value for realizing a state where all user attributes are allocated when user attributes are designated randomly or according to predetermined rules in the advertisement delivery order request is a predetermined value or smaller.

Reallocating Unit 26

The reallocating unit 26 performs a reallocating process of exchanging an allocated user who is a delivery target user allocated to the advertisement delivery order request by the allocating unit 25 with a non-allocated user so that the allocation score determined by the score determining unit 24 increases. The reallocating unit 26 uses the combined user attribute as one user attribute similarly to the allocating unit 25.

The reallocating unit 26 performs the reallocating process by performing three-party exchange. Specifically, the reallocating unit 26 allocates a non-allocated user to an allocatable order request (hereinafter referred to as a first order request) and allocates a delivery target user allocated to the first order request to another order request (hereinafter referred to as a second order request). Then, the reallocating unit 26 changes the delivery target user allocated to the second order request to a non-allocated user.

For example, it is assumed that the advertisement information table is in the state illustrated in FIG. 3 and the future log table is in the state illustrated in FIG. 6. Moreover, in FIG. 6, it is assumed that the "psychographic attribute" includes only four attribute categories of "vehicles," "cosmetics," "clothes," and "travel," and the "demographic attribute" includes only two attribute categories of "sex" and "age." Moreover, it is assumed that the non-allocated users are delivery target users having the delivery target IDs "F0001," "F0003," "F0004," and "F0006." In this case, as illustrated in FIG. 7, the total number of user attributes is "15," and in the first determination mode, the score determining unit 24 determines that the allocation score is "15."

When the reallocating process is performed, first, the reallocating unit 26 selects the delivery target user having the delivery target ID "F0001," for example, as one non-allocated user. The delivery target user having the delivery target ID "F0001" has the user attribute "travel," then the reallocating unit 26 selects the order request having the advertisement ID "A0002," for example, in which the user attribute "travel" is designated as the first order request. Moreover, the reallocating unit 26 selects a delivery target user having the delivery target ID "F0005" illustrated in FIG. 6 as a delivery target user allocated to the first order request, for example.

Since the delivery target user having the delivery target ID "F0005" has the user attribute "vehicle," the reallocating unit 26 selects the order request having the advertisement ID "A0001," for example, in which the user attribute "vehicle" is designated as the second order request. Moreover, the reallocating unit 26 selects the delivery target ID "F0007" as a delivery target user allocated to the second order request, for example.

In an exchange in which the delivery target user having the delivery target ID "F0001" is allocated to the order request having the advertisement ID "A0002," the allocation of the delivery target user having the delivery target ID "F0005" is changed to the order request having the advertisement ID "A0001," and the delivery target user having the delivery target ID "F0007" is changed to the non-allocated user, the allocation score is "16" in the first determination mode. Thus, the reallocating unit 26 executes the reallocating process in such an exchange combination.

The reallocating unit 26 determines an increase or decrease in the allocation score of all non-allocated users caused by the exchange and executes the reallocating process in such an exchange combination when the allocation score increases. Since the allocation score is the total number of user attributes, the larger the allocation score, the more the number of choices for allocation of the delivery target user to a new order request can be increased.

The reallocating unit 26 may execute the reallocating process in respective two or more non-allocated users rather than executing the reallocating process in the respective individual non-allocated users. Moreover, in the above description, although the reallocating unit 26 performs the reallocating process in the three-party exchange combination, two-party exchange or four or more-party exchange where non-allocated users are exchanged with allocated users may be performed instead of the three-party exchange. In this case, similarly, the reallocating unit 26 performs the reallocating process in such a combination that the allocation score increases.

For example, when the reallocating process is performed based on two-party exchange, first, the reallocating unit 26 selects the delivery target user having the delivery target ID "F0001," for example, as one non-allocated user. Since the delivery target user having the delivery target ID "F0001" has the user attribute "travel," the reallocating unit 26 selects the order request having the advertisement ID "A0002" in which the user attribute "travel" is designated, for example. Then, the reallocating unit 26 selects the delivery target ID "F0005" as the delivery target user allocated to the order request having the advertisement ID "A0002," for example.

When the delivery target user having the delivery target ID "F0001" is allocated to the order request having the advertisement ID "A0002" and the delivery target user having the delivery target ID "F0005" is changed to a non-allocated user, the allocation score is "16" in the first determination mode. Thus, since the allocation score increases, the reallocating unit 26 executes the reallocating process in such an exchange combination.

The reallocating unit 26 may perform the reallocating process by changing the order of the allocating process to the order request instead of the reallocating process based on n-party exchange (n is an integer of 2 or more). For example, it is assumed that the order requests having the advertisement IDs "A0001," "A0002," "A0003" and "A004" are accepted in that order by the accepting unit 23, and the allocating unit 25 performs the delivery target user allocating process in that order. In this case, the reallocating unit 26 can execute the reallocation process if the allocation score increases when the delivery target user reallocating process is performed in the order of the advertisement IDs "A0004," "A0003," "A0002," and "A0001," for example.

In the case of reallocation based on n-party exchange, the reallocating unit 26 performs the reallocating process so that the allocation score increases in the respective individual non-allocated users or in a plurality of non-allocated users. In this case, reallocation may be executed in such an exchange combination that an increase in the allocation score is maximized for respective non-allocated users. Moreover, the reallocating unit 26 may execute the reallocation in such an exchange combination that an increase in the score is a predetermined value or more.

The allocating process of the reallocating unit 26 is performed using all allocated users in the future log table as exchange candidates at a predetermined point in time. That is, the reallocating unit 26 performs the allocating process using all delivery target users in which "1" is set are the allocation state in the future log table as exchange candidates. The reallocating unit 26 may exclude allocated users who are selected as exchange candidates in the reallocating process from exchange candidates. Moreover, the reallocating unit 26 may exclude allocated users who are selected as exchange candidates in a predetermined number of reallocating processes from exchange candidates.

The point in time (hereinafter referred to as a reallocation point in time) when, the reallocating unit 26 performs the reallocating process can be set by an administrator of the advertisement delivery management apparatus 1 using an operating unit (not illustrated). The reallocation point in time may occur repeatedly every predetermined period or may occur based on the number of order requests, the number of user attributes, the number or proportion of non-allocated users, and the like, for example.

For example, the reallocating unit 26 may perform the reallocating process in every predetermined period. For example, the reallocating unit 26 may perform the reallocating process in a period where a few order requests are received from the advertiser terminal 3 (for example, in the night). In this way, the reallocating process can be performed in a period where the processing load of the control unit 15 is low.

The reallocating unit 26 may perform the reallocating process whenever the allocating unit 25 performs an allocating process for a predetermined number of order requests. Moreover, the reallocating unit 26 may perform the reallocating process when the accumulated number of user attributes designated by the order requests having been subjected to the allocating process is a predetermined number or more. By doing so, the reallocating process is not performed when the number of order requests or designated user attributes is small, and thus the processing load of the control unit 15 can be reduced.

Further, the reallocating unit 26 may perform the reallocating process when the number of non-allocated users is a predetermined value or smaller. By doing so, the reallocating process is not performed when there are many non-allocated users, and thus the processing load of the control unit 15 can be reduced.

The reallocating unit 26 acquires the allocation score from the score determining unit 24 in the same determination mode as the determination mode set in the allocating unit 25. For example, when the allocating unit 25 performs the allocating process based on the allocation score in the first determination mode, the reallocating unit 26 performs a reallocating process based on the allocation score in the first determination mode.

3. Process Flow of Advertisement Delivery Management Apparatus 1

Next, the procedure of the advertisement delivery management process of the advertisement delivery management apparatus 1 according to the embodiment will be described.

Figure 8:
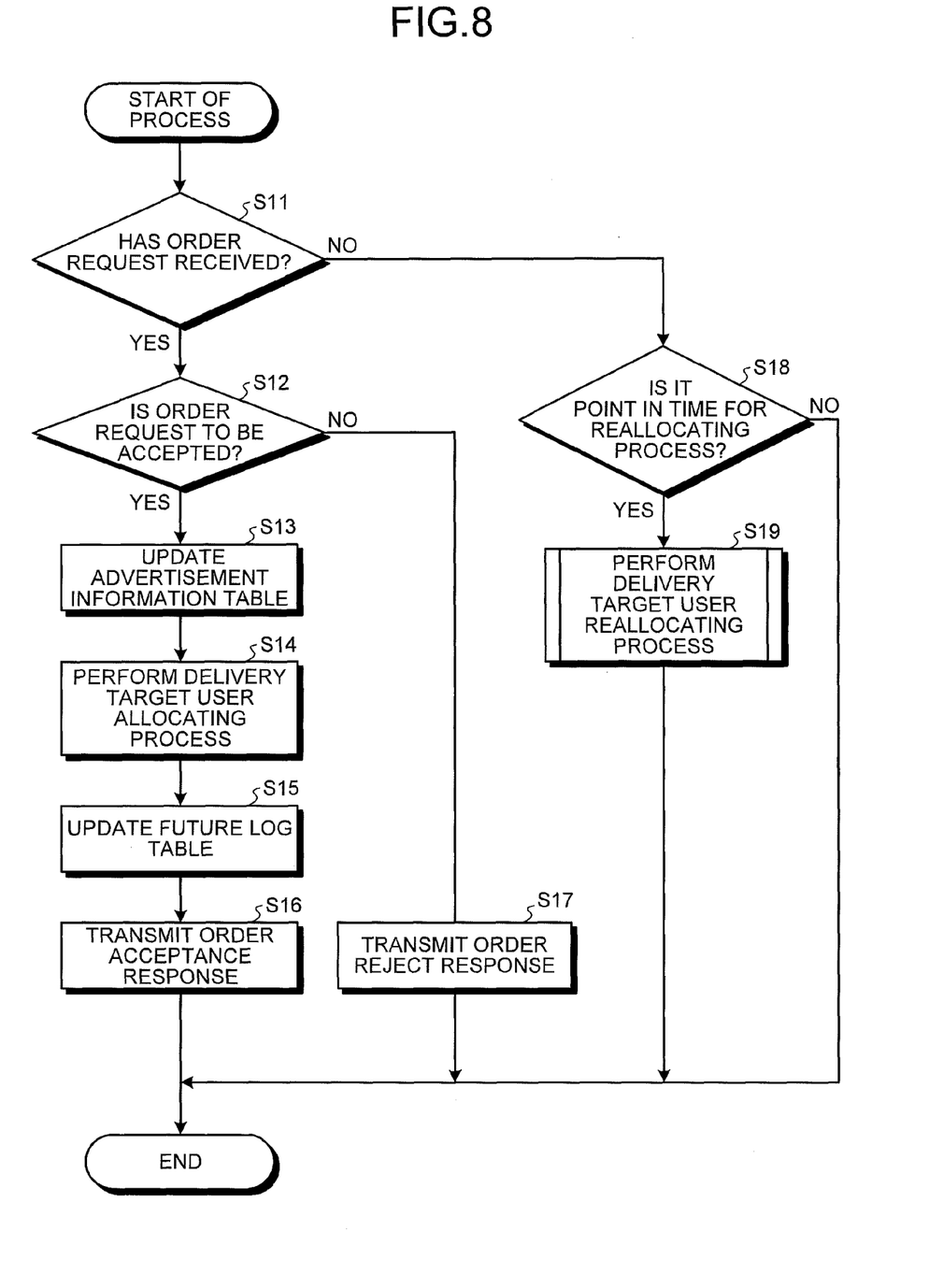
FIG. 8 is a diagram illustrating the flow of an advertisement delivery management process of the advertisement delivery management apparatus according to the embodiment.

FIG. 8 is a diagram illustrating an example of the flow of the advertisement delivery management process of the advertisement delivery management apparatus 1 according to the embodiment. The flow of the advertisement delivery management process is a process that is repeatedly executed by the control unit 15 of the advertisement delivery management apparatus 1, and the processes of the accepting unit 23, the allocating unit 25, and the reallocating unit 26 in the control unit 15 will be mainly described.

As illustrated in FIG. 8, when the advertisement delivery management process starts, the control unit 15 of the advertisement delivery management apparatus 1 determines whether the order request is received from the advertiser terminal 3 (step S11). When it is determined that the order request is received from the advertiser terminal 3 (Yes in step S11), the control unit 15 determines whether the order request from the advertiser terminal 3 is to be accepted based on the future log set in the future log table (step S12). The control unit 15 counts the number of user attributes designated by the order request among the user attributes of non-allocated users set in the future log table, for example, and determines that the order request is to be accepted when the counted number is equal to or larger than the number of postings designated by the order request.

When it is determined that the order request from the advertiser terminal 3 is to be accepted (Yes in step S12), the control unit 15 sets the information included in the order request to the advertisement information table to update the advertisement information table (step S13). The information included in the order request includes a user attribute, a posting period, the number of postings, and advertisement information, and these items of information are set in the advertisement information table.

Subsequently, the control unit 15 performs a delivery target user allocating process (step S14). With this allocating process, the non-allocated user having the user attribute designated by the order request is allocated to the order request.

Subsequently, the control unit 15 updates the future log table based on the result of the allocating process of step S14 (step S15). Specifically, the control unit 15 changes the non-allocated user allocated to the order request among the non-allocated users set in the future log table to an allocated user. The change from the non-allocated user to the allocated user is performed by changing the "allocation state" from "0" to "1."

After that, the control unit 15 transmits an order acceptance response to the advertiser terminal 3 via the communicating unit 10 (step S16) and ends the advertisement delivery management process. On the other hand, when it is determined in step S12 that the order request from the advertiser terminal 3 is not to be accepted (No in step S12), the control unit 15 transmits an order reject response to the advertiser terminal 3 via the communicating unit 10 (step S17) and ends the advertisement delivery management process.

When it is determined in step S11 that the order request from the advertiser terminal 3 is not to be received (No in step S11), the control unit 15 determines whether it is the point in time for the reallocating process (step S18). When it is determined that it is the point in time for the reallocating process (Yes in step S18), the control unit 15 performs the delivery target user reallocating process (step S19).

When the process of step S19 ends or when it is determined in step S18 that it is not the point in time for the reallocating process (No in step S18), the control unit 15 ends the advertisement delivery management process.

Figure 9:
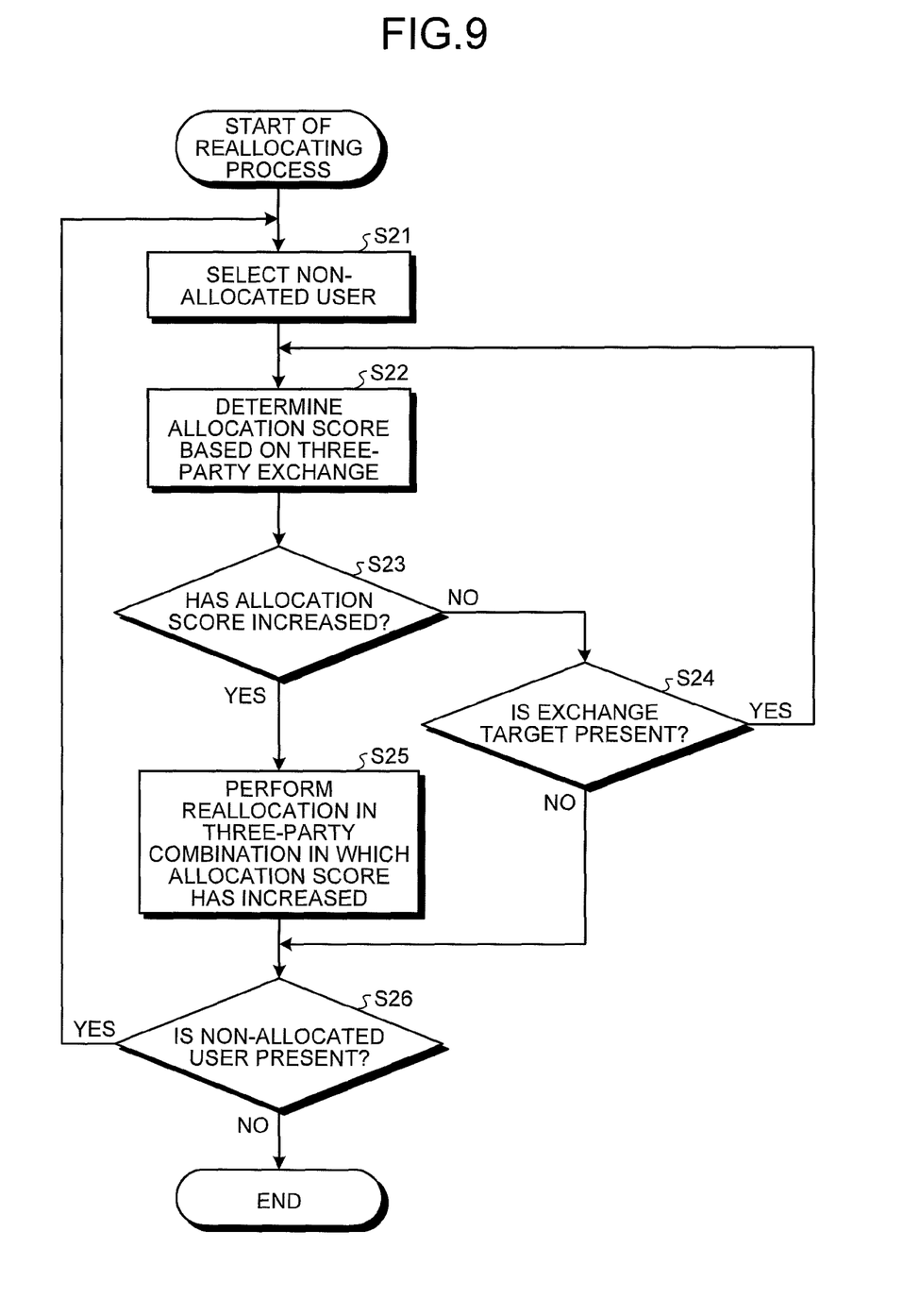
FIG. 9 is a diagram illustrating an example of the flow of an allocating process of the advertisement delivery management apparatus according to the embodiment.

Next, an example of the reallocating process of step S19 will be described in detail with reference to FIG. 9. FIG. 9 is a diagram illustrating an example of the flow of the reallocating process of the advertisement delivery management apparatus 1 according to the embodiment.

As illustrated in FIG. 9, when the delivery target user allocating process starts, the control unit 15 of the advertisement delivery management apparatus 1 selects one non-allocated user among the delivery target users in the future log table (step S21).

Subsequently, the control unit 15 determines the allocation score based on three-party exchange (step S22). Specifically, the control unit 15 selects one allocated user (hereinafter referred to a first allocated user) allocated to a first order request among the delivery target users in the future log table and one allocated user (hereinafter referred to as a second allocated user) allocated to a second order request. Then, the control unit 15 determines the allocation score for the three-party exchange in which one non-allocated user selected in step S21 is allocated to the first order request, the first allocated user is allocated to the second order request, and the second allocated user is changed to a non-allocated user.

The control unit 15 determines whether the allocation score has increased before and after the three-party exchange in step S22 (step S23). In this process, when it is determined that the allocation score based on three-party exchange has increased (Yes in step S23), the control unit 15 executes reallocation in the three-party exchange combination where the allocation score increases (step S25).

On the other hand, when it is determined in step S22 that the allocation score is not increased before and after the three-party exchange (No in step S23), the control unit 15 determines whether an allocated user to be exchanged is present (step S24). In this process, when an allocated user who is not subjected to the process of step S22 is present, the control unit 15 determines that an allocated user to be exchanged is present. When the allocated user to be exchanged is present (Yes in step S24), the control unit 15 proceeds to step S22.

When the allocated user to be exchanged is not present (No in step S24) or when the process of step S25 ends, the control unit 15 proceeds to step S26.

In step S26, the control unit 15 determines whether a non-allocated user who is not subjected to the three-party exchange process is present (step S26). The control unit 15 proceeds to step S21 when the non-allocated user who is not subjected to the three-party exchange process is present (Yes in step S26) and ends the reallocating process in other cases (No in step S26).

4. Modification

In the above embodiment, although the allocation score is determined based on non-allocated users, the score determining unit 24 may determine the allocation score based on allocated users. In this case, the allocation score can be also calculated according to the first to fourth determination modes and the like. For example, in the first determination mode, the score determining unit 24 uses a reciprocal of the total number of user attributes of allocated users as the allocation score. In the second determination mode, the score determining unit 24 uses a proportion of the allocated users having the user attribute in which the proportion of the allocated user is largest as the allocation score. In the third and fourth determination modes, the score determining unit 24 determines the allocation score in the same method.

The score determining unit 24 may determine the allocation score switchably based on allocated users and non-allocated users according to predetermined conditions. For example, the score determining unit 24 determines the allocation score based on allocated users when the number of allocated users is larger than the number of non-allocated users. On the other hand, when the number of allocated users is equal to or smaller than the number of non-allocated users, the allocation score is determined based on non-allocated users. In this way, for example, when the allocation score is determined based on the total number of user attributes, the processing load of the advertisement delivery management apparatus 1 can be reduced.

In the above-described embodiment, although the reallocating unit 26 acquires the allocation score from the score determining unit 24 in the same determination mode as the determination mode set in the allocating unit 25, the allocation score may be acquired from the score determining unit 24 in a determination mode different from the determination mode set in the allocating unit 25.

The reallocating unit 26 may execute the reallocating process when the number or the proportion of non-allocated users is a predetermined value or smaller. By doing so, since the reallocating process is not performed when it is possible to sufficiently perform the process of receiving the order requests, the processing load of the control unit 15 can be reduced. The proportion of non-allocated users is the ratio of the number of non-allocated users to the number of delivery target users set in the future log table, for example.

5. Effects

In the advertisement delivery management apparatus 1 according to the embodiment, the future log DB 14 (an example of a predicted information storage unit) stores information including user attributes of a plurality of delivery target users predicted as future advertisement delivery destinations, the allocating unit 25 (an example of an allocating unit) allocates the delivery target user to an advertisement delivery order request based on the information stored in the future log DB 14, and the reallocating unit 26 (an example of a reallocating unit) performs a reallocating process of exchanging the delivery target user allocated to the advertisement delivery order request with a non-allocated user who is a delivery target user that has not been allocated to the advertisement delivery order request.

With this configuration, by reallocating the delivery target users after the delivery target users are allocated to the advertisement delivery order request, it is possible to appropriately allocate the delivery target users to the advertisement delivery order request. In this way, since the number of choices for allocation of delivery target users to the order request increases and the possibility of accepting future order requests increases, it is possible to suppress a loss of sales opportunity. For example, when the delivery target users are allocated whenever the advertisement delivery order request is accepted, overall allocation may not be realized appropriately. However, even in such a case, by reallocating the delivery target users, the delivery target users are appropriately allocated.

The score determining unit 24 (an example of a score determining unit) determines an allocation score corresponding to an allocation state of the plurality of delivery target users with respect to the advertisement delivery order request, and the reallocating unit 26 performs a reallocating process so that the allocation score increases.

With this configuration, since the reallocating process can be performed based on the allocation score corresponding to the allocation state of the plurality of delivery target users, it is possible to suppress the reallocating process from becoming complex.

The score determining unit 24 determines a score corresponding to a total number of user attributes of the non-allocated users or a score corresponding to the number of non-allocated users for individual user attributes as the allocation score.

With this configuration, it is possible to appropriately increase the number of choices for allocation of the delivery target users with respect to the order request. For example, by increasing the total number of user attributes of the non-allocated users, it is possible to increase the number of choices for allocation of the delivery target users to the order request. Moreover, by appropriately setting the number or the proportion of non-allocated users for individual user attributes, it is possible to suppress a decrease in the possibility of accepting future advertisement delivery order requests.

The reallocating unit 26 performs the reallocating process if the allocation score increases when the reallocating process is performed in such a way that the non-allocated user is allocated to a first order request, a delivery target user allocated to the first order request is allocated to a second order request, and a delivery target user allocated to the second order request is changed to a non-allocated user.

With this configuration, it is possible to suppress complexity of the exchange process and reduce the processing load while improving the possibility of increasing the allocation score. In such three-party exchange, since one non-allocated user and two allocated users are involved, it is possible to increase the number of exchange combinations as compared to two-party exchange. In this way, it is possible to improve the possibility of increasing the allocation score.

The reallocating unit 26 performs the reallocating process every predetermined period or whenever a predetermined number of order requests are received.

With this configuration, since reallocation can be performed periodically, it is possible to increase the number of choices for allocation of the delivery target users to the order request and to increase the possibility of accepting future order requests. Moreover, by accepting order requests in the daytime and performing the reallocating process in the night, it is possible to deliver the processing load of the advertisement delivery management apparatus 1. Moreover, the exchange process is executed whenever a predetermined number of order requests are received.

The reallocating unit 26 performs the reallocating process when the number of non-allocated users is a predetermined value or smaller.

With this configuration, by not performing the reallocating process when there are many non-allocated users, it is possible to reduce the processing load of the advertisement delivery management apparatus 1.

The reallocating unit 26 performs the reallocating process by using a combination of two or more user attributes of which the frequency designated in the advertisement delivery order request is a threshold value or more as one user attribute.

With this configuration, the user attributes can be allocated to the order request using a combination of two or more user attributes of which the frequency designated in the order request is a threshold value or more. In this way, it is possible to increase the possibility of accepting future advertisement delivery orders and to suppress the loss of sales opportunity.

6. Others

The advertisement delivery management apparatus 1 may be realized as a plurality of server computers, and depending on a function, may be realized by calling an external platform using an application programming interface (API) or network computing. That is, the configuration of the advertisement delivery management apparatus 1 can be flexibly changed. Moreover, the advertisement delivery management apparatus 1 and the information delivery apparatus 2 may be realized as one server computer.

According to an aspect of the embodiment, it is possible to provide an advertisement delivery management apparatus and an advertisement delivery management method capable of appropriately allocating delivery target users to advertisement delivery orders.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An advertisement delivery management apparatus comprising:
    a memory storing information including user attributes of a plurality of delivery target users predicted as future advertisement delivery destinations, the plurality of delivery target users including allocated users and non-allocated users; and
    a processor operatively coupled with the memory, the processor being programmed to:
    receive an advertisement delivery order request designating at least one user attribute;
    allocate at least one of the plurality of delivery target users to the received advertisement delivery order request based on the at least one user attribute designated by the advertisement delivery order request and the stored user attributes of the plurality of delivery target users;
    determine an allocation score of the non-allocated users of the plurality of delivery target users based on: (i) a total number of user attributes of the non-allocated users or the allocated users, or (ii) a number of the non-allocated users or the allocated users to each of the user attributes;
    based on a period of time where a relatively small number of advertisement delivery requests are received, select at least one of the non-allocated users of the plurality of delivery target users and determine whether the allocation score increases when the selected at least one of the non-allocated users is replaced with at least one of the allocated users of the plurality of delivery target users; and
    based on determining that the allocation score increases, perform a reallocation process by replacing the at least one allocated user with the selected at least one of the non-allocated users such that the allocation score of the non-allocated users is increased relative to the determined allocation score, and the reallocating process is performed during the period of time where the relatively small number of advertisement delivery requests are received in order to reduce the processing load on the processor.

2. The advertisement delivery management apparatus according to claim 1, wherein the processor is programmed to:
    determine the allocation score corresponding to an allocation state of the plurality of delivery target users with respect to the advertisement delivery order request; and
    perform the reallocating process so that the allocation score increases.

3. The advertisement delivery management apparatus according to claim 2, wherein the processor is programmed to perform the reallocating process when the allocation score increases by performing the reallocating process in such a way that the non-allocated user is allocated to a first order request, a delivery target user allocated to the first order request is allocated to a second order request, and a delivery target user allocated to the second order request is changed to a non-allocated user.

4. The advertisement delivery management apparatus according to claim 1, wherein the processor is programmed to perform the reallocating process every predetermined period or when a predetermined number of the order requests are received.

5. The advertisement delivery management apparatus according to claim 1, wherein the processor is programmed to perform the reallocating process when a number of the non-allocated users is a predetermined value or smaller.

6. The advertisement delivery management apparatus according to claim 1, wherein the processor is programmed to perform the reallocating process by using a combination of two or more user attributes of which a frequency designated by the advertisement delivery order request is at least a threshold value as one user attribute.

7. An advertisement delivery management method performed by a computer, the method comprising:
    receiving an advertisement delivery order request designating at least one user attribute;
    allocating at least one of the plurality of delivery target users to the received advertisement delivery order request based on the at least one user attribute designated by the advertisement delivery order request and user attributes of the plurality of delivery target users stored in a memory;
    determining an allocation score of the non-allocated users of the plurality of delivery target users based on: (i) a total number of user attributes of the non-allocated users or allocated users of the plurality of delivery target users, or (ii) a number of the non-allocated users or the allocated users to each of the user attributes;
    based on a period of time where a relatively small number of advertisement delivery requests are received, selecting at least one of the non-allocated users of the plurality of delivery target users and determining whether the allocation score increases when the selected at least one of the non-allocated users is replaced with at least one of the allocated users of the plurality of delivery target users; and
    based on determining that the allocation score increases, performing a reallocation process by replacing the at least one allocated user with the selected at least one of the non-allocated users such that the allocation score of the non-allocated users is increased relative to the determined allocation score, and the reallocating process is performed during the period of time where the relatively small number of advertisement delivery requests are received in order to reduce the processing load on the processor.

8. The advertisement delivery management method according to claim 7, further comprising:
    determining the allocation score corresponding to an allocation state of the plurality of delivery target users with respect to the advertisement delivery order request; and performing the reallocating process by replacing the delivery target user allocated to the order request with the non-allocated user so that the allocation score increases.

9. The advertisement delivery management method according to claim 8, further comprising allocating the non-allocated user to a first order request, allocating a delivery target user allocated to the first order request to a second order request, and changing a delivery target user allocated to the second order request to a non-allocated user.

10. The advertisement delivery management method according to claim 7, wherein the reallocating process includes replacing the delivery target user allocated to the order request with the non-allocated user every predetermined period or whenever a predetermined number of the order requests are received.

11. The advertisement delivery management method according to claim 7, wherein the reallocating process includes replacing the delivery target user allocated to the order request with the non-allocated user when the number of non-allocated users is a predetermined value or smaller.

12. The advertisement delivery management method according to claim 7, wherein the reallocating process includes replacing the delivery target user allocated to the order request with the non-allocated user by using a combination of two or more user attributes of which a frequency designated by the advertisement delivery order request is at least a threshold value as one user attribute.

13. The advertisement delivery management apparatus according to claim 2, wherein the processor is programmed to perform the reallocating process when a number of the non-allocated users is a predetermined value or smaller.

14. The advertisement delivery management apparatus according to claim 3, wherein the processor is programmed to perform the reallocating process when a number of the non-allocated users is a predetermined value or smaller.

15. The advertisement delivery management apparatus according to claim 4, wherein the processor is programmed to perform the reallocating process when a number of the non-allocated users is a predetermined value or smaller.

16. The advertisement delivery management apparatus according to claim 1, wherein the processor is programmed to:
   in the period of time where the relatively small number of advertisement delivery order requests are received, select two or more of the non-allocated users of the plurality of delivery target users and determine whether the allocation score increases when the selected two or more of the non-allocated users are replaced with two or more of the allocated users of the plurality of delivery target users; and
   based on the determination that the allocation score increases, perform a reallocating process by replacing the two or more allocated users with the selected two or more of the non-allocated users such that the allocation score of the non-allocated users is increased relative to the determined allocation score.

17. The advertisement delivery management apparatus according to claim 1, wherein the processor is programmed to determine, as the allocation score, a number or a proportion of non-allocated users having a specific user attribute in which a number or a proportion of non-allocated users is smallest among those of the user attributes of the plurality of delivery target users.

18. The advertisement delivery management apparatus according to claim 1, wherein the processor is programmed to:
   calculate a proportion of a number of non-allocated users or allocated users for each of the user attributes to a total number of user attributes of the plurality of delivery target users; and
   determine, as the allocation score, a total value of the calculated proportions or a proportion which is smallest among the calculated proportions.

* * * * *